UNITED STATES PATENT OFFICE.

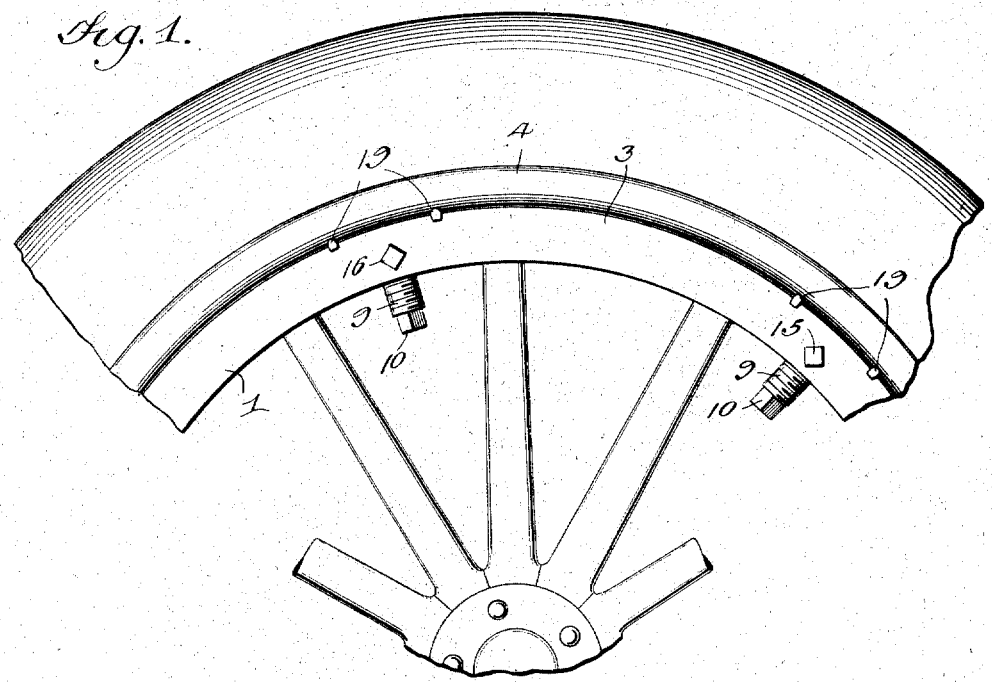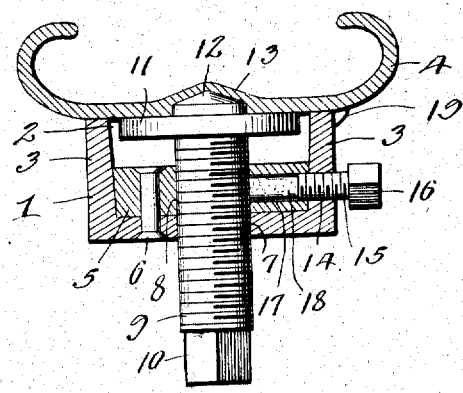

KAMIL J. NAHAS, OF DETROIT, MICHIGAN.

DEMOUNTABLE-RIM LOCK.

1,275,075.   Specification of Letters Patent.   Patented Aug. 6, 1918.

Application filed November 14, 1917. Serial No. 201,996.

*To all whom it may concern:*

Be it known that I, KAMIL J. NAHAS, a citizen of the United States, residing at Detroit, in the county of Wayne and State of Michigan, have invented new and useful Improvements in Demountable-Rim Locks, of which the following is a specification.

This invention relates to demountable rim locks, the object of the invention being to produce reliable, strong and effective means for securely locking a demountable tire carrying rim upon and in fixed relation to the fixed rim and felly of a vehicle wheel.

A further object of the invention is to provide locking means of the character referred to which may be expeditiously operated for holding and releasing the demountable rim.

A further object of the invention is to provide in conjunction with the primary elements of the locking means, additional locking means which will prevent the initial members of the locking means from working loose.

With the above and other objects in view, the invention consists in the novel construction, combination and arrangement of parts, herein described, illustrated and claimed.

In the accompanying drawings:—

Figure 1 is a fragmentary side elevation of a vehicle wheel showing the improved locking means.

Fig. 2 is a cross section through the same on an enlarged scale taken in line with one set of locking means.

In the preferred embodiment of the present invention, I employ a fixed rim 1 of channeled formation, said rim having a channel 2 extending entirely around the outer face thereof thereby providing side flanges 3 upon which the demountable rim 4 is supported.

In conjunction with the fixed rim, I employ a plurality of sets of locking mechanisms one of which is illustrated in Fig. 2. Each set of locking means comprises a stationary block 5 which is brazed or welded or otherwise fixedly secured in the bottom of the channel of the fixed rim 1. The block 5 may be securely held in fixed relation to the rim 1 by mechanical fastening means such as rivets 6. A threaded bore 7 is formed centrally of the base of the fixed rim 1 and the block 5 is also formed with a threaded bore 8 in line with the bore 7. A rim locking screw 9 is threaded through the bores 7 and 8 and provided at its inner end with a squared or non-circular portion 10 adapted to receive a wrench for tightening or loosening said screw. Adjacent to its outer end the screw 9 is formed with a relatively large flange or disk-shaped head 11 designed to form a broad bearing support for the inner face of the demountable rim 4. The screw is formed beyond the head 11 with a central knob or projection 12 forming in effect an extension of the body of the screw 9 and the rim 4 is formed with a corresponding recess 13 in the inner face thereof adapted to receive the knob or projection 12. One of the flanges 3 of the fixed rim 1 is formed with a threaded bore 13 to receive a locking screw 15 having at its outer end a head 16. The block 8 is formed with a smooth bore 17 in line with the bore 14 and in said smooth bore is placed a clamping shoe 18 of some soft metal such as brass. As the shoe 18 is forced inwardly by tightening the screw 15, the inner end of said shoe is forced into firm frictional and binding contact with the threads of the screw 9 thereby preventing said screw 9 from working loose. The rim 4 is formed with a plurality of stop projections 19 which come in contact with one of the flnages 3 of the fixed rim 1 so as to properly position the demountable rim thereon. By unscrewing the rim locking screws 9, the demountable rim 4 may be removed laterally from the fixed rim 1. After returning the demountable rim to its working position, the screws 9 are turned so as to force the projections 12 into the recesses 13 and bring the flange or head 11 to bear firmly against the inner face of the demountable rim. Then the shoes 18 are forced into binding engagement with the rim locking screws 9 by means of the screws 15.

I claim:—

1. In a demountable rim lock, the combination of a fixed rim having a channel in the outer face thereof and flanges at opposite sides of said channel, a demountable rim encircling said channeled rim, and securing means for said demountable rim comprising a block seated in the channel of the fixed rim and fixedly held therein, said block and fixed rim being formed with threaded bores in line with each other and extending radially of the wheel, a rim locking screw threaded through said bores and having an enlarged flange to bear against the inner face of the demountable rim and also formed with a central projection beyond said flange, the demountable rim being formed in its inner face with a recess to receive said projection, said block being formed with a bore intersecting said threaded bore, substantially at a right angle, a locking member for said screw mounted in the last named bore, and means for advancing said locking member against said screw.

2. In a demountable rim lock, the combination of a fixed rim having a channel in the outer face thereof and flanges at opposite sides of said channel, a demountable rim encircling said channeled rim, and securing means for said demountable rim comprising a block seated in the channel of the fixed rim and fixedly held therein, said block and fixed rim being formed with threaded bores in line with each other and extending radially of the wheel, a rim locking screw threaded through said bores and having an enlarged flange to bear against the inner face of the demountable rim and also formed with a central projection beyond said flange, the demountable rim being formed in its inner face with a recess to receive said projection, said block being formed with a smooth bore intersecting said threaded bore at substantially a right angle, a screw engaging shoe mounted for movement longitudinally of the last named bore, and a locking screw threaded through one of the side flanges of the fixed rim and adapted to press said shoe into engagement with the threads of the rim locking screw.

In testimony whereof I affix my signature.

KAMIL J. NAHAS.